United States Patent
Moore

(10) Patent No.: US 6,302,362 B1
(45) Date of Patent: Oct. 16, 2001

(54) PAPER HOLDER

(75) Inventor: Gregory C. Moore, Belton, TX (US)

(73) Assignee: Best-Rite Manufacturing, Temple, TX (US)

( * ) Notice: Subject to any disclaimer, the term of this patent is extended or adjusted under 35 U.S.C. 154(b) by 138 days.

(21) Appl. No.: 08/979,592

(22) Filed: Nov. 26, 1997

(51) Int. Cl.$^7$ .................................................. F16L 3/00
(52) U.S. Cl. .................... 248/73; 248/316.3; 248/452; 248/447.1; 248/316.1
(58) Field of Search .................... 248/73, 447.1, 248/289.11, 316.3, 316.1, 316.2, 442.2, 452, 225.11, 231.31, 231.81, 257, 298.1, 295.11

(56) References Cited

U.S. PATENT DOCUMENTS

| | | | |
|---|---|---|---|
| 3,168,954 | * | 2/1965 | Von Herrmann ........................ 211/50 |
| 3,399,429 | * | 9/1968 | Goodman .................................. 24/66 |
| 3,591,013 | * | 7/1971 | Von Herrmann ........................ 211/50 |
| 3,675,782 | * | 7/1972 | Dudley ..................................... 211/50 |
| 4,311,295 | * | 1/1982 | Jamar, Jr. .............................. 248/221.3 |
| 4,456,286 | * | 6/1984 | Jamar ..................................... 281/15 B |
| 4,693,443 | * | 9/1987 | Drain ....................................... 248/447 |
| 5,048,782 | * | 9/1991 | Cauffman et al. ................. 248/225.2 |
| 5,050,832 | * | 9/1991 | Lee et al. ............................ 248/225.2 |
| 5,711,430 | * | 1/1998 | Anderson et al. ....................... 211/45 |

* cited by examiner

*Primary Examiner*—Ramon O. Ramirez
*Assistant Examiner*—Kimberly T. Wood
(74) *Attorney, Agent, or Firm*—Wendy K. Buskop; Buskop Law Group, P.C.

(57) ABSTRACT

An apparatus for holding a piece of paper, poster board or the like on a relatively flat vertical surface. The apparatus can be used on existing map rails or on an easel-like structure. The apparatus has a housing with a longitudinal axis, a front wall, a back wall, a top wall, a top portion and a bottom portion. The front wall has an upper end connected to the top wall and a lower end that is generally C-shaped and is angled toward the back wall to form a chamber to loosely hold a rod. The housing further defines an opening between the lower end and the back wall. The also defines an attachment means that extends from the back wall so that the apparatus can be attached to a surface. A method for positioning a piece of paper on a substantially vertical surface is also disclosed.

13 Claims, 4 Drawing Sheets

PAPER HOLDER

BACKGROUND OF THE INVENTION

The present invention relates to an apparatus for holding a piece of paper or poster board in a substantially vertical plane.

Current technology provides many different document holders. These holders employ springs and or clips to hold the paper in place. The springs and clips tend to wear out over time or break from improper use. A document holder that does not require springs and clips to hold the document in place would be very useful.

Other document holders also employ roller devices that require two handed operation. Thus making it difficult to operate. A document holder that is easy to use with one hand would also be very helpful and desirable.

OBJECTS OF THE INVENTION

It is an object of the present invention to provide a document holder that can be operated with one hand.

It is another object of the present invention to provide a document holder that is easy to manufacture and assemble.

It is yet another object of the present invention to provide a document holder that can be used on existing map rails in classrooms or the like.

SUMMARY OF THE INVENTION

One embodiment of the present invention relates to an apparatus for holding a piece of paper, poster board or the like on a relatively flat vertical surface. The apparatus can be used on existing map rails or on an easel-like structure. The apparatus has a housing with a longitudinal axis, a front wall, a back wall, a top wall, a top portion and a bottom portion. The front wall has an upper end connected to the top wall and a lower end that is generally C-shaped and is angled toward the back wall to form a chamber to loosely hold a rod. The housing further defines an opening between the lower end and the back wall. The also defines an attachment means that extends from the back wall so that the apparatus can be attached to a surface.

A method for positioning a piece of paper on a substantially vertical surface is also provided. The method includes using an apparatus as described above. A piece of paper or poster board is positioned in the apparatus by sliding it between the rod means and the back wall of the housing, so that the rod means moves to a first position. In the first position, the rod means rests against the back wall of the housing and the paper is positioned between the rod means and the back wall of the housing. The rod means essentially holds the paper or poster board in place by gravity. To remove the paper, the piece of paper is lifted in an upward direction and pulled from between the rod means and the back wall of the housing so that the rod means moves to a second position.

In the second position, the rod means rolls toward the front wall of the housing allowing the piece of paper to easily be removed from the housing.

DETAILED DESCRIPTION OF THE PREFERRED EMBODIMENTS

Figure 1:
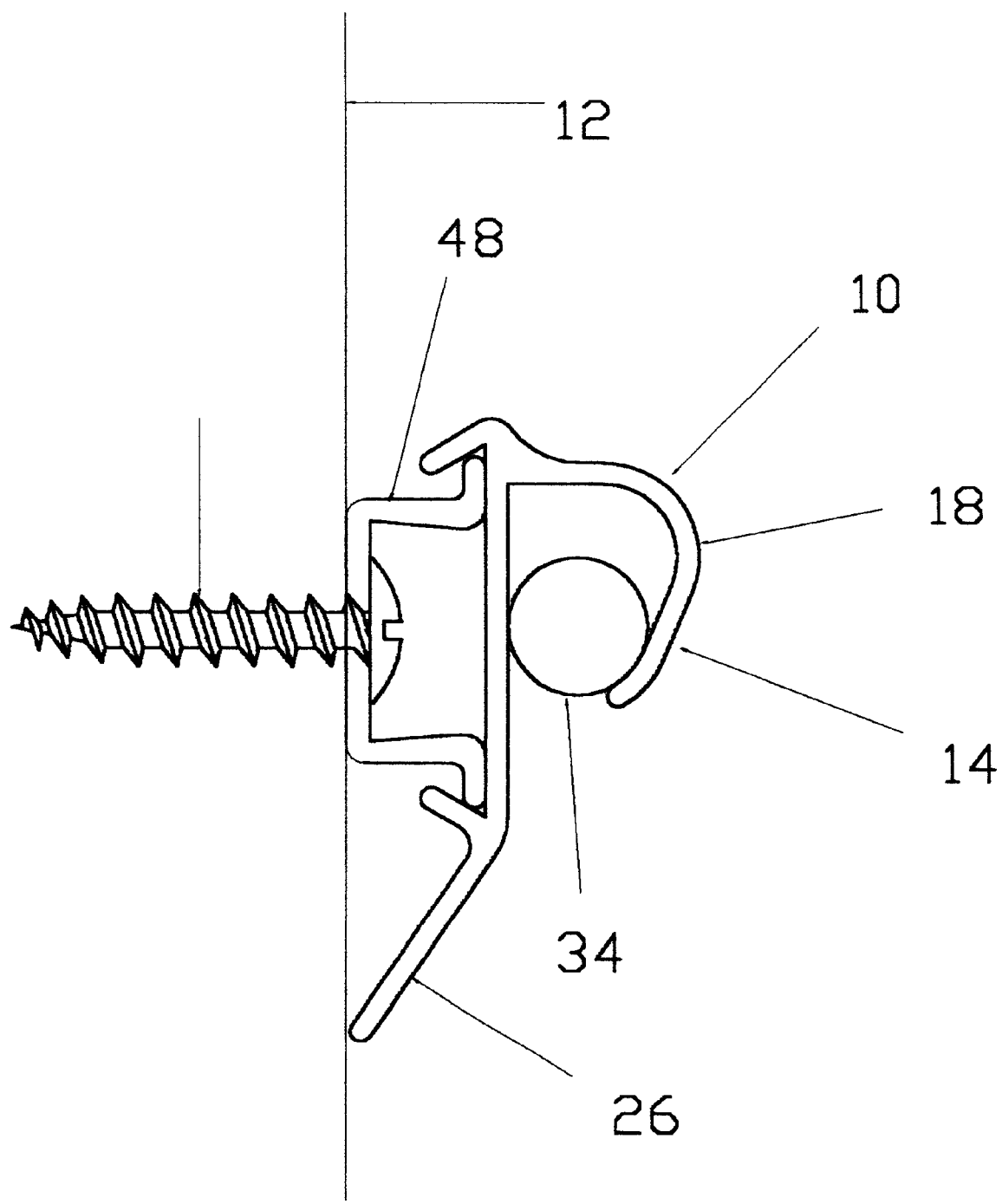
FIG. 1 is a cross-sectional view of one embodiment of the present invention.

The present invention provides for an apparatus 10 for holding documents or poster board in a substantially vertical plane, either against a wall 12 or other support structure. The apparatus 10 comprises a housing 14 having a longitudinal axis, a front wall 18, a back wall 20, a top wall 22, a top portion 24 and a bottom portion 26. The the front wall 18 has an upper end 28 connected to the top wall 22 and a lower end 30 that is generally C-shaped and is angled toward the back wall 20 to form a chamber 32 to loosely hold a rod. Preferably, the bottom portion 26 of the housing 14 is angled away from the front wall 18 of the housing 14.

The housing 14 defines an opening 36 between the lower end 30 and the back wall 20 for receiving a piece of paper or poster board. The housing 14 also defines an attachment means 46 that extends from the back wall 20 so that the apparatus 10 can be attached to a surface. Suitable surfaces for attachment can be walls, writing boards, easels, or other surfaces where one would want to display a piece of paper or poster board.

Figure 7:
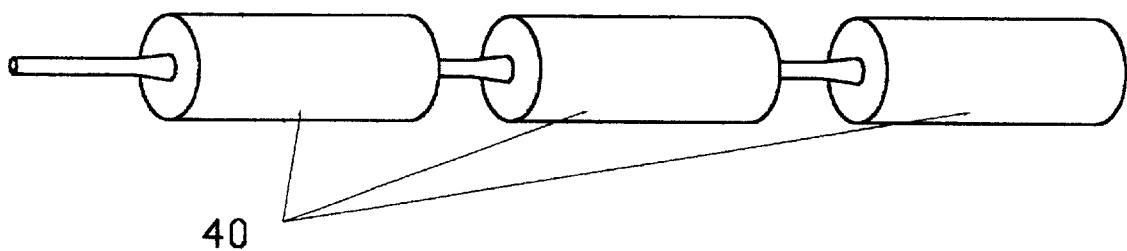
FIG. 7 is a perspective view of the rod means.

Preferably, there is a rod means 34 mounted within the chamber 32 in a plane that is generally parallel to the longitudinal axis of the housing 14. The rod means 34 can be a series of tubular pieces 40 of equal diameter that extend the length of the housing 14. (FIG. 7)

Figure 2:
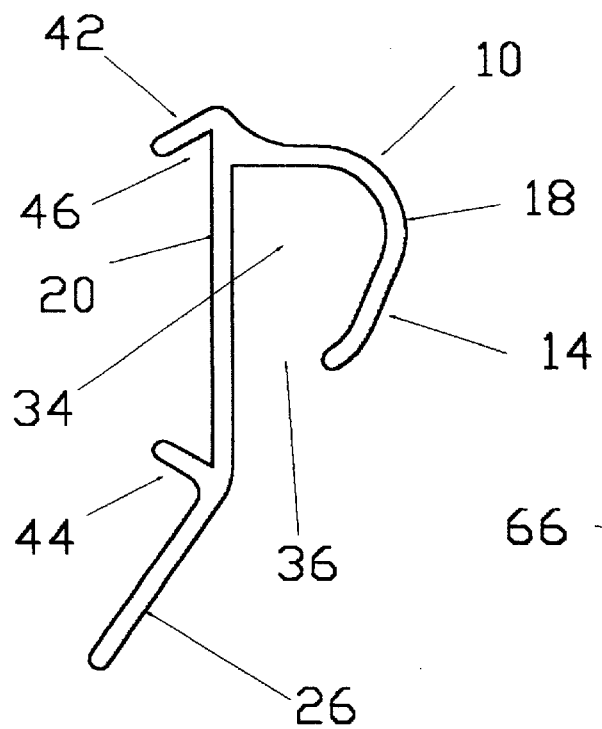
FIG. 2 is an end view of one embodiment of the present invention.

In a preferred embodiment, the attachment means 46 comprises at least one first ear 42 and at least one second ear 44 extending from the back wall 20 away from the longitudinal axis of the housing 14. The at least one first ear 42 and the at least one second ear 44 are in a spaced apart relationship to each other across the back wall 20. The at least one first ear 42 and the at least one second ear 44 preferably form a longitudinally extending slot 46 that is in a plane parallel with the longitudinal axis of the housing 14. The at least one first ear 42 forms an acute angle with the back wall 20 of the housing 14 and the at least one second ear 44 also forms an acute angle with the back wall 20 of the housing 14. (FIG. 2)

Figure 3:
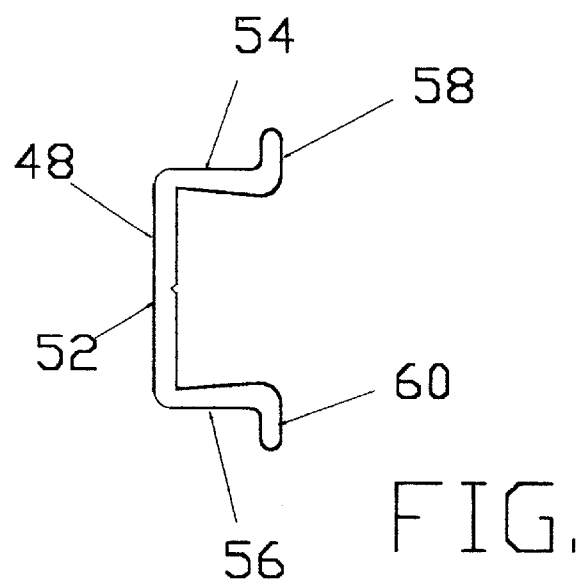
FIG. 3 is an end view of a map rail.

One way of mounting the apparatus 10 to a surface can be a longitudinally elongated wall mount 48 for receiving the attachment means 46. (FIG. 3) The wall mount 48 forms a generally U-shaped track having a back wall 52, a top side wall 54 and a bottom side wall 56 extending from the back wall 52. The top sidewall forms a first lip 58 and the bottom side wall 56 forms a second lip 60, the first lip 58 and second lip 60 are sized to be slidably received by the attachment means 46. The back wall 52 is attached to a substantially vertical surface. The first lip 58 and second lip 60 of the wall mount 48, slidably engage the longitudinally extending slot 46 of the housing 14, so that the apparatus 10 may be secured to a wall or other surface. The housing 14 including the attachment means 46 are of unitary construction and can be formed from an extrusion mold.

Figure 4:
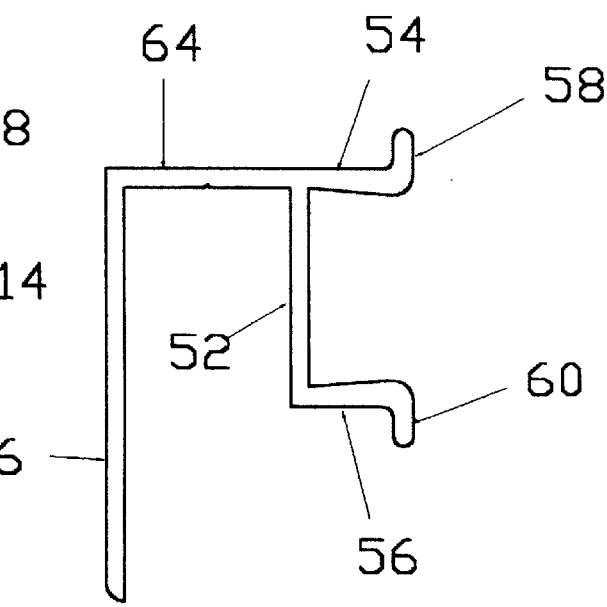
FIG. 4 is an end view of an alternate embodiment of the present invention.

In the alternative, the wall mount 48 can form an L-shaped bracket 62 extending therefrom as shown in FIG. 4. The L-shaped bracket can have a first wall 64 that extends from the top side wall 54 and a second wall 66 that extends from the first wall 64 in a plane parallel to the back wall 52. The bracket 62 can then be adapted to fit over an existing chalkboard or other surface to support the apparatus 10.

Preferably, the at least one second ear 44 forms an angle of from approximately 80 to 90 degrees with the bottom portion 26 of the housing 14. The bottom portion 26 of the housing 14 forms an angle of from approximately 30 to 40 degrees with a vertical plane extending through the back wall 20 of the housing 14. The at least one second ear 44 forms an angle of from approximately 55 to 65 degrees with a vertical plane extending through the back wall 20 of the housing 14.

In another embodiment of the present invention, there is provided a housing 14 as described above and further including a longitudinally elongated wall mount 48 for receiving the attachment means 46. The wall mount 48 forms a generally U-shaped track having a back wall 52, a top side wall 54 and a bottom side wall 56 extending from the back wall 52 like that described above. Preferably, the bottom portion 26 of the housing 14 is angled away from the front wall 18 of the housing 14. The bottom portion 26 of the housing 14 can be angled away from the front wall 18 so that it rests against the vertical surface it is mounted on to provide more support for the apparatus 10. The attachment means 46 as described above, is slidably received by the wall mount 48.

In another embodiment of the present invention, there is provided, a method for positioning a piece of paper on a substantially vertical surface. A housing 14 is provided like that described above. A rod means 34 is mounted in the housing 14. Preferably, the rod means 34 is comprised of several tubular pieces 40 placed end to end in the housing 14. A piece of paper or poster board is positioned by sliding it between the rod means and the back wall 20 of the housing 14, so that the rod means moves to a first position. In the first position, the rod means 34 rests against the back wall 20 of the housing 14 and the paper is positioned between the rod means 34 and the back wall 20 of the housing 14. The rod means 34 essentially holds the paper or poster board in place by gravity. To remove the paper, the piece of paper is lifted in an upward direction and pulled from between the rod means 34 and the back wall 20 of the housing 14 so that the rod means moves to a second position. In the second position, the rod means rolls toward the front wall 18 of the housing 14 allowing the piece of paper to easily be removed from the housing 14.

Figure 5:
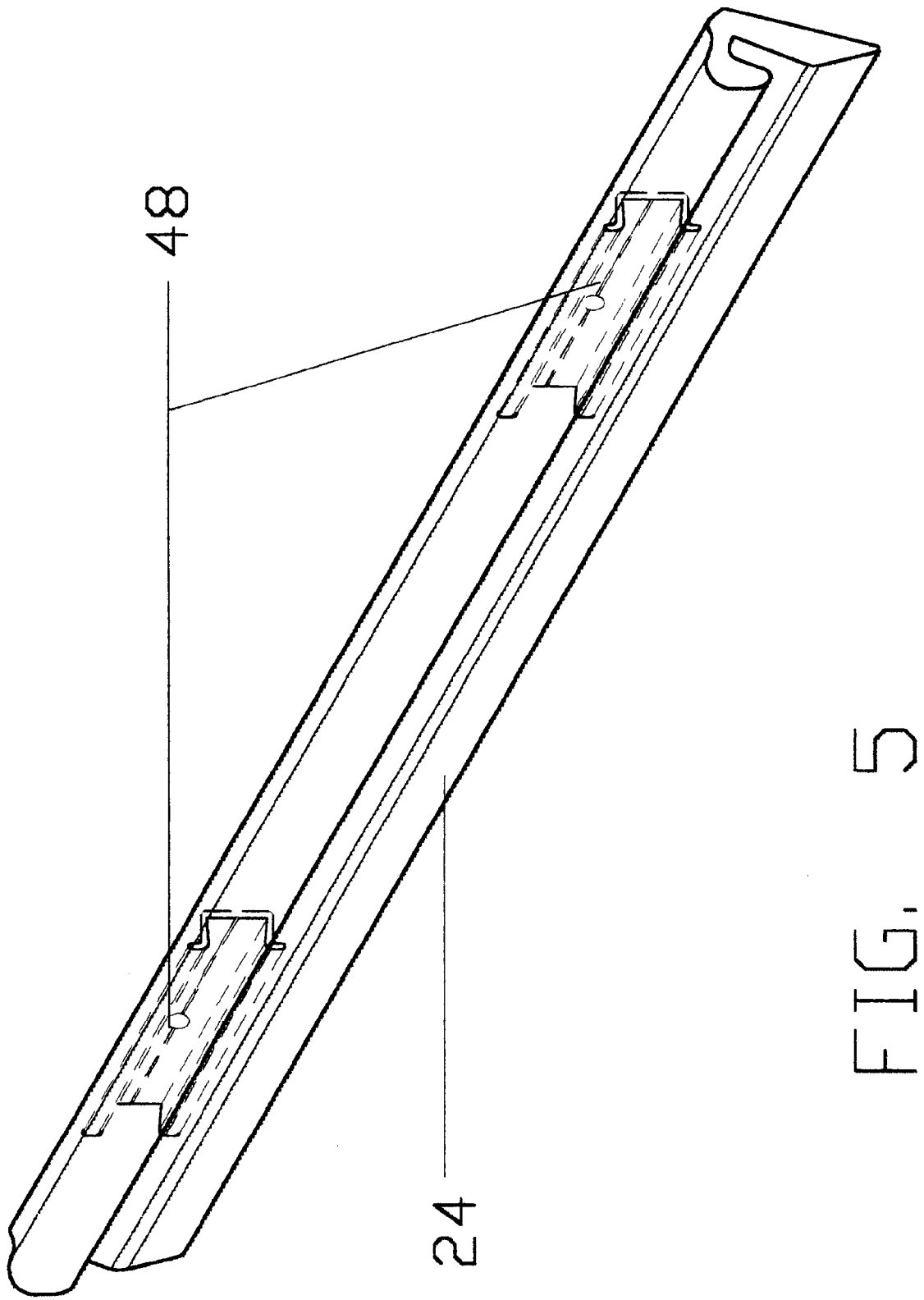
FIG. 5 is a front view of one embodiment of the invention.
Figure 6:
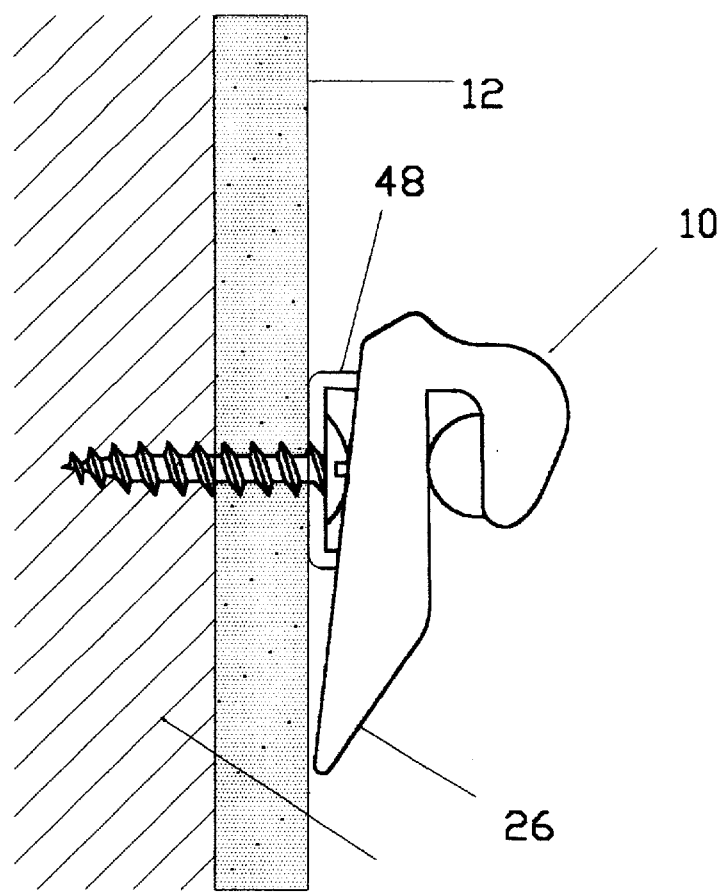
FIG. 6 is a cross-sectional view of one embodiment of the present invention.

The housing 14 can be mounted on a wall by attaching a mounting means, such as a map rail, to the wall with screws or the like as shown in FIGS. 1 and 5. Then the attachment means 46 on the back of the housing 14 slides over the map rail or track. Rubber buttons 68 can be attached to the ends of the housing 14 to keep the housing 14 from sliding off the map rail or track. The buttons 68 can be attached to the housing by pressing them through a hole defined by the housing 14.

While certain preferred embodiments of the invention have been described herein, the invention is not to be construed as so limited, except to the extent that such limitations are found in the claims.

I claim:

1. An apparatus comprising:
   a housing having a longitudinal axis, a front wall, a back wall, a top wall, a top portion and a bottom portion, wherein the front wall has an upper end connected to the top wall and a lower end that is generally C-shaped and is angled twoard the back wall to form a chamber to loosely hold a rod means, said housing futher defines an opening between saidlower end and said back wall; and
   wherein said housing futher defines an attachemnt means that extends from the back wall so that the apparatus can be attached to a surface, and wherein said attachment means comprises at least one first ear and at least one second ear extending from the back wall away from the longitudinal axis of the housing wherein the at least one first ear and the at least one second ear are in a spaced apart relationship to each other across the back wall to form a longtintudinal extending slot that is in a plane parallel with the longitudianl axis of the housing, and wherein the device further includes
   a longtinudinally elongated wall mount for receiving the attachment means, said wall mount forming a generallyu u-shaped track having a back wall, a top side wall and a bottom side wall extending from the back wall, wherein said top sidewall forms a first lip and said bottom side wall forms a second lip, said first lip and second lip being sized to be slidably received by the attachment means.

2. The apparatus of claim 1, wherein the bottom portion of the housing is angled away from the front wall of the housing.

3. The apparatus of claim 2, further comprising a rod means mounted within said chamber in a plane that is generally parallel to the longitudinal axis of said housing.

4. The apparatus of claim 3, wherein said rod means comprises a plurality of generally tubular pieces.

5. The apparatus of claim 1, wherein said at least one first ear forms an acute angle with the back wall of the housing and said at least one second ear forms an acute angle with the back wall of the housing.

6. The apparatus of claim 1, wherein the first lip and second lip of the wall mount, slidably engage the longitudinally extending slot of the housing.

7. The apparatus of claim 1, wherein said housing and said attachment means are of unitary construction.

8. The apparatus of claim 1, wherein said second ear forms an angle of from approximately 80 to 90 degrees with the bottom portion of the housing, wherein the bottom portion of the housing forms an angle of from approximately 30 to 40 degrees with a vertical plane extending through the back wall of the housing.

9. The apparatus of claim 1, wherein the second ear forms an angle of from approximately 55 to 65 degrees with a vertical plane extending through the back wall of the housing.

10. An apparatus comprising:
    a housing having a longitudinal axis, a front wall, a back wall, a top wall, a top portion and a bottom portion, wherein the front wall has an upper end connected to the top wall and a lower end that is generally C-shaped and is angled toward the back wall to form a chamber to loosely hold a rod means, said housing further defines an opening between said lower end and said back wall;
    wherein said housing member futher defines an attachment means that extends from the back wall so that the apparatus can be attached to a surface; and
    a longitudinally elongated wall mount for receiving the attachment means, said wall mount forms a generally U-shaped track having a back wall, a top side wall and a bottom side wall extending from the back wall, wherein said top sidewall forms a first lip and said bottom side wall forms a second lip, and first lip and second lop being sized to be slidably received by the attachment means; and wherein said attachment means comprises at least one first ear and at least one second ear extending from the back wall away from the longitudinal axis of the housing, wherein the at least one first ear and the at least one second ear are in a spaced apart relationship to each other across the back wall; and wherein said at least one first ear and said at least one second ear form a longitudinally extending slot that is in a plane parallel with the longitudinal axis of the housing.

11. The apparatus of claim 10, wherein the bottom portion of the housing is angled away from the front wall of the housing.

12. The apparatus of claim 10, further comprising a rod means mounted within said chamber in a plane that is generally parallel to the longitudinal axis of said housing.

13. A method for positioning a piece of paper on a substantially vertical surface, said method comprising:

providing a housing having a longitudinal axis, a front wall, a back wall, a top wall, a top portion and a bottom portion, wherein the front wall has an upper end connected to the top wall and a lower end that is generally C-shaped and is angled toward the back wall to form a chamber to loosely hold a rod means, said housing further defines an opening between said lower end and said back wall; and said housing defines an attachment means that extends from the back wall so that the apparatus can be attached to a surface;

mounting a rod means in said housing;

sliding a piece of paper between the rod means and the back wall of the housing, so that the rod means moves to a first position;

pulling the piece of paper from between the rod means and the back wall of the housing so that the rod means moves to a second position allowing the piece of paper to easily be removed from the housing.

* * * * *

UNITED STATES PATENT AND TRADEMARK OFFICE
CERTIFICATE OF CORRECTION

PATENT NO.        : 6,302,362 B1
APPLICATION NO. : 08/979592
DATED             : October 16, 2001
INVENTOR(S)      : Gregory C. Moore It is certified that error appears in the above-identified patent and that said Letters Patent is hereby corrected as shown below:

1. In column 2, "slot 46" is changed to -- slot 47 -- in lines 43 and 60

2. In column 3, "68" is deleted in lines 52 and 54

3. In column 3, line 67, "towoard" is changed to -- toward --

4. In column 4, line 2, "saidlower" is changed to -- said lower --

5. In column 4, line 3, "attachemnt" is changed to -- attachment --

6. In column 4, line 12, "longitudianl" is changed to -- longitudinal --

7. In column 4, line 16, "generallyu" is changed to -- generally --

8. In column 4, line 66, "lap" is changed to -- lip --

Signed and Sealed this

Nineteenth Day of February, 2008

JON W. DUDAS
*Director of the United States Patent and Trademark Office*